(12) United States Patent
Ho et al.

(10) Patent No.: US 7,071,249 B2
(45) Date of Patent: Jul. 4, 2006

(54) BIODEGRADABLE STARCH RESIN AND METHOD FOR MAKING SAME

(76) Inventors: William Ho, 40-17 78th St., Elmhurst, NY (US) 11373; Ling-I Chen, 702 Scripps Dr., Claremont, CA (US) 91711

( * ) Notice: Subject to any disclaimer, the term of this patent is extended or adjusted under 35 U.S.C. 154(b) by 224 days.

(21) Appl. No.: 09/972,661

(22) Filed: Oct. 5, 2001

(65) Prior Publication Data
US 2003/0100635 A1    May 29, 2003

(51) Int. Cl.
*C08L 3/00* (2006.01)
*C08L 1/00* (2006.01)
*C08L 1/12* (2006.01)

(52) U.S. Cl. .................... 524/39; 523/124; 523/128; 524/9; 524/35; 524/47; 524/52; 524/407

(58) Field of Classification Search ............ 524/47, 524/501, 502, 378, 313, 276, 277, 515, 9, 524/35, 39, 52, 407; 523/124, 128
See application file for complete search history.

(56) References Cited

U.S. PATENT DOCUMENTS

| | | | |
|---|---|---|---|
| 4,337,181 A | 6/1982 | Otey et al. | 523/128 |
| 4,673,438 A | 6/1987 | Wittwer et al. | 106/126 |
| 5,095,054 A | 3/1992 | Lay et al. | 524/47 |
| 5,234,978 A | 8/1993 | Delrue et al. | 524/53 |
| 5,262,458 A | 11/1993 | Bastioli et al. | 524/52 |
| 5,292,782 A | 3/1994 | Bastioli et al. | 524/47 |
| 5,334,634 A | 8/1994 | Bastioli et al. | 524/47 |
| 5,412,005 A | 5/1995 | Bastioli et al. | 524/47 |
| 5,449,708 A | 9/1995 | Schiltz | 524/47 |
| 5,462,982 A | 10/1995 | Bastioli et al. | 524/47 |
| 5,569,692 A | 10/1996 | Bastioli et al. | 524/47 |
| 5,589,518 A | 12/1996 | Bastioli et al. | 521/55 |
| 5,691,403 A * | 11/1997 | Shitaohzono et al. | 524/47 |
| 5,741,521 A | 4/1998 | Knight et al. | 424/488 |
| 5,801,207 A | 9/1998 | Bastioli et al. | 521/84.1 |
| 5,874,486 A | 2/1999 | Bastioli et al. | 523/126 |
| 5,969,053 A * | 10/1999 | Bauman et al. | 525/331.5 |
| 6,096,809 A | 8/2000 | Lorcks et al. | 524/47 |
| 6,274,652 B1 * | 8/2001 | Uryu et al. | 524/27 |

FOREIGN PATENT DOCUMENTS

| | | | |
|---|---|---|---|
| EP | 417828 | * | 3/1991 |
| JP | 59-196335 | | 2/1983 |
| JP | 09-296076 | | 4/1996 |
| WO | WO 92/16583 | | 10/1992 |
| WO | WO 92/16584 | | 10/1992 |

* cited by examiner

*Primary Examiner*—Ana Woodward
(74) *Attorney, Agent, or Firm*—Jones Day

(57) ABSTRACT

The present invention relates generally to biodegradable compositions containing starch, especially in combination with a polymer containing pendant carboxylic acid groups, a polyolefin homopolymer or copolymer, water, an oil component, and other optional components, including (co)polymers, additives, and/or fillers. These biodegradable compositions may preferably be used in footwear articles and smoking-related filters.

27 Claims, No Drawings

BIODEGRADABLE STARCH RESIN AND METHOD FOR MAKING SAME

FIELD OF THE INVENTION

The present invention relates generally to biodegradable compositions containing starch, especially in combination with other (co)polymers and additives. These biodegradable compositions may preferably be used in footwear articles and smoking-related filters.

BACKGROUND OF THE INVENTION

Polymer blend compositions containing starches or starch derivatives are well known. Such compositions are generally desired to be biodegradable, as well as to possess a wide variety of other physical, thermal, and/or chemical properties. Exemplary publications disclosing polymer compositions comprising starches or starch derivatives include the following.

U.S. Pat. No. 4,337,181 describes biodegradable film-forming formulations comprising starch, ethylene-acrylic acid copolymer, and optionally polyethylene for use in agricultural mulch, garbage bags, and various types of packaging. According to the disclosure, the ethylene-acrylic acid copolymer must be neutralized and the moisture content in the formulation must be adjusted before a suitable film can be fabricated.

U.S. Pat. No. 5,095,054 describes thermoplastic polymer blend compositions containing destructurized starch and either a substantially water-insoluble thermoplastic polymer or another polymer component or both. According to the disclosure, the other polymer component is at least one of: 1) a polymer containing at least two different types of functional groups, one being hydroxyls; 2) a polymer not containing hydroxyl groups but containing at least two other different types of functional groups, one being carboxylates; 3) a polymer containing tertiary amino or quaternary ammonium groups; 4) a polysaccharide chemically modified to contain hydroxyalkyl, alkyl ether, and/or ester groups; 5) a vinyl pyrrolidone copolymer; 6) a cationically-modified polysaccharide; 7) an anionically-modified polysaccharide; 8) a vinyl alcohol-olefin copolymer, made by hydrolyzing a vinyl ester-olefin copolymer; 9) a polysaccharide graft copolymer or derivative thereof; 10) a polyalkyleneimine polymer or copolymer; 11) a styrene-sulfonic acid polymer or copolymer, or a salt thereof; and 12) a polymer or copolymer containing partially or fully neutralized carboxylic acid groups and no other functional groups.

U.S. Pat. No. 5,234,978 describes a biodegradable composition comprising an unsaturated hydrocarbon polymer, a lower alkyl or hydroxyalkyl ether of starch having a degree of substitution of at least 0.25, a polyhydric alcohol having 2–10 carbon atoms and 2–6 hydroxyl groups, and a compatibilizing agent. According to the disclosure, the compatibilizing agent can be a vinyl copolymer, acrylic copolymer, or a mixture thereof.

U.S. Pat. No. 5,262,458 describes biodegradable articles and methods for forming such articles. According to the disclosure, the articles comprise destructurized starch, an ethylene-acrylic acid copolymer, and a product of the interaction of ethylene-acrylic acid copolymer and starch particles smaller than 1 micron. Optionally, urea and/or ammonia may also be added to the articles. The method of obtaining such biodegradable articles is also set forth to comprise the steps of extruding the starch, ethylene-acrylic acid copolymer, and optionally water, urea, and/or ammonia, from 90° C. to 150° C., reducing the water content to below 6% by weight, and injection molding or extrusion blowing the resulting composition.

U.S. Pat. No. 5,288,765 and International Publication No. WO 91/02023 both describe expanded articles, and methods of making such articles using extrusion, each comprising a composition including starch, a polymer compatible with starch (i.e., ethylene-acrylic acid and/or ethylene-vinyl alcohol copolymer(s)), and an expanding agent. According to the disclosure, the expanding agent is preferably sodium bicarbonate. U.S. Pat. No. 5,360,830 describes similar expanded articles that are further characterized by a closed pore structure and a density of from 0.01 to less than 0.1 $g/cm^3$.

U.S. Pat. No. 5,292,782 describes a biodegradable polymeric composition that contains starch, a synthetic thermoplastic polymer, and a plasticizer that is a polyol or a derivative, reaction product, or oxidation product thereof. According to the disclosure, the starch and the synthetic thermoplastic polymer form a structure in which they are at least partially interpenetrated at the molecular level.

U.S. Pat. Nos. 5,334,634 and 5,462,982, as well as European Patent No. EP 0 758 669 A2, describe biodegradable polymer compositions, articles made therefrom, and processes for preparing such compositions. In each case, the composition is disclosed to comprise a destructured starch (or a starch in combination with a destructuring agent such as urea), a thermoplastic polymer such as an ethylene-vinyl alcohol copolymer, and a high-boiling plasticizer such as glycerol. According to the disclosures, no water is added to assist in destructuring the starch.

U.S. Pat. No. 5,412,005 describes biodegradable polymeric compositions that contain a starch-based component and a polymeric component, which itself contains polymers of hydroxyacids or mixtures thereof with polymers deriving from ethylenically unsaturated monomers, e.g., such as PVA and EVA.

U.S. Pat. No. 5,449,708 describes a starch-based biodegradable polymer, as well as a method for its continuous preparation. According to the disclosure, the starch-based biodegradable polymer is taught to be a homogeneous mixture of starch, an ethylene-acrylic acid copolymer, a salt of stearic acid, and an aqueous lubricant material.

U.S. Pat. No. 5,569,969 describes a starch-based composition and a method for producing biodegradable articles therefrom. The starch-based composition contains a starch, a destructuring agent, a plasticizer, and optionally polyvinyl alcohol and/or ethylene-vinyl alcohol. According to the disclosure, the destructuring of the starch takes place between 120° C. and 170° C., while below the plasticizer boiling point. The composition without PVA and/or EVA is disclosed to be suitable for extrusion, while that with the optional component(s) is disclosed to be suitable for blow molding, injection molding, or thermoforming.

U.S. Pat. Nos. 5,801,207 and 5,589,518 relate to biodegradable foamed articles and processes for preparation of such articles, respectively, such that the foamed articles have a density of 5–300 $kg/m^3$ and are formed from agglomerated particles comprising 30–98.5% by weight of a thermoplastic natural polymer capable of absorbing at least 15% of its weight of water (e.g., a thermoplastic starch), 1.5–70% by weight of a thermoplastic polymer, and 0–20% by weight of water. According to the disclosures, a bonding agent is also present to allow compressive bonding of the particles into a closed cell foam.

U.S. Pat. No. 5,654,353 describes a degradable starch resin composition, as well as a process for preparation and a use of such a composition. According to the disclosure, the composition is a starch concentrate made by mixing starch, a mixing promoter, a plasticizer, a biodegradation accelerator containing a bioactive agent, and an alkaline additive. Also according to the disclosure, the process for preparation comprises selecting the biodegradation accelerator, preparing the modified starch concentrate, and extruding and pelletizing a mixture of the modified starch concentrate, an ethylene-acrylic acid copolymer, and a polyvinyl resin. The product is disclosed to be particularly useful for light or heavy packaging films or for agricultural films.

U.S. Pat. No. 5,741,521 describes a biodegradable or digestible matrix and its use in the controlled release of an agriculturally active agent. The biodegradable or digestible matrix contains an amylaceous material, optionally in association with a synthetic polymer. According to the disclosure, the amylaceous material is not destructured and includes amylose or a starch, along with an optional filler.

U.S. Pat. No. 5,587,486 describes a biodegradable composition containing a matrix, which includes a starch component, at least one synthetic thermoplastic polymeric component, and a fluidizing agent, with a natural organic filler material dispersed in the matrix. According to the disclosure, the fluidizing agent can be a fatty acid, a fatty alcohol, a polyether or polyglycol ether, an ester or amide of a fatty acid, a reaction product of a fatty acid with a polyglycerol, or a mixture thereof.

U.S. Pat. No. 6,096,809 describes a biologically degradable polymer mixture containing at least one starch biopolymer made from renewable raw materials, a plasticizer, and one or more of the following polymers: aromatic polyester, aliphatic-aromatic polyester block copolymer, polyesteramide, polyglycol, and polyester urethane.

European Patent No. EP 0 942 040 A1 describes a polymeric film comprising 10–60% of starch, 5–20% of a coupling agent such as an ethylene-acrylic acid or ethylene-vinyl acetate copolymer, 20–90% of a stabilizing agent such as polyethylene, 20–60% w/w of starch and water or gelatinizing and plasticizing agents such as urea or carbamide, and 2–10 parts per hundred resin of oligosaccharides. Additionally, this disclosure includes a process taught to be useful for preparing such a polymeric film.

It is desirable to identify compositions containing starch that have advantageous combinations of properties so that any articles made from them have, for example, good degradability, sufficient mechanical properties such as resiliency and tensile or compressive strength, and ease of processability, just to name a few. The present invention identifies such compositions, methods of making them, and articles containing them or formed by the methods of the invention.

SUMMARY OF THE INVENTION

The present invention relates to biodegradable polymeric compositions containing certain components and proportions. In particular, three preferred compositions include: 1) from about 40 to about 52 percent by weight of a starch component, from about 10 to about 15 percent by weight of a polymer containing pendant carboxylic acid functional groups, from about 8.5 to about 12 percent by weight of a polyolefin homopolymer or copolymer, from about 2.5 to about 4 percent by weight of water, from about 1.5 to about 3.5 percent by weight of a polymeric polyol, from about 6 to about 8 percent by weight of an oil component, from about 3 to about 5 percent by weight of a wax component, and from about 20 to about 28 percent by weight of a powdered rubber compound; 2) from about 45 to about 60 percent by weight of a starch component, from about 10 to about 18 percent by weight of a polymer containing pendant carboxylic acid functional groups, from about 8 to about 15 percent by weight of a polyolefin homopolymer or copolymer, from about 2.5 to about 4 percent by weight of water, from about 1.5 to about 3.5 percent by weight of a polymeric polyol, from about 3.5 to about 6 percent by weight of an oil component, from about 3 to about 5 percent by weight of a liquid wax component, and from about 12 to about 20 percent by weight of a powdered rubber compound; and 3) from about 40 to about 50 percent by weight of a starch component, from about 10 to about 15 percent by weight of a polymer containing pendant carboxylic acid functional groups, from about 15 to about 20 percent by weight of a polyolefin homopolymer or copolymer, from about 2.5 to about 4 percent by weight of water, from about 5 to about 7 percent by weight of an oil component, and from about 10 to about 20 percent by weight of a cellulosic polymer.

In any of these compositions, the starch component can include starch obtained from corn, potato, or yam; the polymer containing pendant carboxylic acid functional groups can be obtained by polymerizing a mixture containing at least one $\alpha,\beta$-unsaturated carboxylic acid monomer and at least one $\alpha$-olefin, and is preferably a copolymer of ethylene and acrylic acid; the polyolefin homopolymer or copolymer can be polyethylene; the polymeric polyol can include a polyalkylene glycol, preferably polypropylene glycol; the oil component can include coconut oil; the wax component can be a liquid wax, preferably having a viscosity below about 111 cps at about 20° C.; the powdered rubber compound can include butyl rubber, nitrile rubber, diene rubbers, diene block copolymer rubbers, olefin copolymer rubbers, or mixtures or copolymers thereof, preferably comprises natural rubber and, more preferably, comprises a compound where the rubber component of the compound consists essentially of natural rubber; the powdered rubber compound can also have an average particle diameter in the range of from about 0.5 microns to about 1 mm; and the cellulosic polymer can include cellulose acetate.

Another aspect of the present invention relates to articles containing any of the biodegradable polymeric compositions mentioned herein. Advantageously, the article can be selected from the group consisting of a footwear article or a component part thereof, a filter for gas(es), a smoking-related filter, a children's toy, a bottle, a container, netting, food packaging, a cup, a plate, a bowl, an injection molded article, a compression molded article, a foamed article, a film, and a laminated article. In a preferred embodiment, the article can be a shoe or a component part thereof, a cigarette filter, a fibrous article, or a foamed article.

Yet another aspect of the present invention involves a method of fabricating a biodegradable polymeric resin, which includes the steps of combining the biodegradable composition components to form a resin mixture and extruding the mixture at a temperature between about 120° C. and about 180° C. to form the biodegradable polymeric resin.

In one preferred embodiment, the combining comprises: admixing the polymer containing pendant carboxylic acid functional groups, the powdered rubber compound, and the polyolefin polymer to form a first mixture; adding to that first mixture the polymeric polyol, the oil component, and the water to form a second mixture; and adding to that second mixture the starch component and the wax component to form the resin mixture. In another preferred embodiment, the combining comprises: admixing the polymer containing pendant carboxylic acid functional groups and the polyolefin polymer to form a first mixture; adding to that first mixture the oil component, the water, and the cellulosic polymer to form a second mixture; and adding to that second mixture the starch component to form the resin mixture.

A further preferred embodiment involves a method of fabricating a biodegradable polymeric resin, which includes: combining from about 40 to about 52 percent by weight of a starch component, from about 10 to about 15 percent by weight of a polymer comprising pendant carboxylic acid functional groups, from about 8.5 to about 12 percent by weight of a polyolefin homopolymer or copolymer, from about 2.5 to about 4 percent by weight of water, from about 1.5 to about 3.5 percent by weight of a polymeric polyol, from about 6 to about 8 percent by weight of an oil component, from about 3 to about 5 percent by weight of a wax component, and from about 20 to about 28 percent by weight of a powdered rubber compound to form a mixture; and processing the mixture at a temperature between about 120° C. and about 180° C. to form the biodegradable polymeric resin. The processing step may comprise casting, injection molding, reaction injection molding, blow molding, compression molding, rolling, thermoforming, extrusion, reactive extrusion, solution processing, foaming, or any combination thereof.

In another embodiment, the method further includes processing the biodegradable polymeric resin into an article selected from the group consisting of a footwear article or a component part thereof, a filter for at least one gas, a smoking-related filter, a children's toy, a bottle, a container, netting, food packaging, a cup, a plate, a bowl, an injection molded article, a compression molded article, a foamed article, a film, and a laminated article.

DETAILED DESCRIPTION OF THE PREFERRED EMBODIMENTS

Starch-containing compositions according to the present invention can include, but are not limited to, such components as a starch component; a polymer containing pendant carboxylic acid functional groups; a polyolefin homopolymer or copolymer; water; a polymeric polyol; an oil component; a wax component; a powdered rubber compound; and a cellulosic polymer.

The relative proportions of the components of the starch-containing compositions of the present invention can be tailored to obtain particular properties of the composition that may depend upon the desired end use. For instance, certain components may impart increases or decreases in: degradability, speed or efficiency of degradation, viscosity, inherent viscosity, intrinsic viscosity, molecular weight distribution, gel strength, bulk density, tackiness, hydrogen-bonding characteristics, orientation, degree of crystallinity, crystalline perfection, softening point, melt flow index, transition temperatures (e.g., glass transition temperature(s), melting temperature(s), and the like), heterogeneity, homogeneity, oxidation stability, UV, infrared, and/or visible light stability, photochemical stability, processability (whether castability, moldability, lubriciousness, flowability, agglomeration, film formation, extrudability, or the like), fatigue resistance, creep, creep compliance, stress relaxation time, compression set, compressibility, compressive strength, compression modulus, tensile strength, tensile modulus, flexural strength, flexural modulus, yield stress, yield strain, strain at break, plasticization, viscoelasticity, chemical resistance, thermal stability, thermoplastic character, elastic character, water (or organic solvent) solubility, water (or organic solvent) permeability, oxygen or nitrogen (or other vapor) solubility, oxygen or nitrogen (or other vapor) permeability, water (or organic solvent) wettability, water (or organic solvent) contact angle (e.g., static, dynamic, advancing, or receding), surface energy, electrical properties (e.g., resistance, conductance, etc.), magnetic properties, and/or the like, as well as combinations thereof.

In the compositions of the present invention, starch may be present in its natural form (e.g., as extracted from one or more plants, or as purified by any method), in a destructured form, or in any number of chemically modified derivative forms (e.g., alkyoxylated derivatives, esterified derivatives, ionically modified starches, oxidized starches, grafted starches, crosslinked starches, or the like, or mixtures thereof), preferably in its natural form. Although starch isolated and/or purified from any one or more plants may be useful in the present invention, those from corn, potato, or yam are especially preferred. Most preferred are corn-based starches. In another preferred embodiment, the starch consists essentially of a corn-based starch.

In the compositions of the present invention, the polymer containing pendant carboxylic acid functional groups can include (co)polymers made from one or more types of monomers, at least one of which contains at least one carboxylic acid functional group, and (co)polymers made from monomers that do not contain carboxylic acid functional groups but that are modified during or after polymerization so as to contain at least one carboxylic acid moiety pendant to the (co)polymer backbone. In the latter case, the method of post-polymerization modification may be any known to appropriately functionalize the (co)polymer, for example, such as hydrolysis, chemical oxidation, irradiation, plasma treatment (e.g., with carbon dioxide), laser ablation, or the like.

According to the present invention, (co)polymers made from one or more types of monomers that contain at least one carboxylic acid functional group can include, but are not limited to, (co)polymers made from a (mixture of) monomer(s) containing at least one $\alpha,\beta$-unsaturated carboxylic acid. In one preferred embodiment, a copolymer made from at least one $\alpha,\beta$-unsaturated carboxylic acid monomer and at least one $\alpha$-olefin is used. In another preferred embodiment, an acrylic acid or methacrylic acid (co)polymer is used. More preferably, a copolymer of acrylic acid or any alkacrylic acid (i.e., methacrylic acid, ethacrylic acid, etc.), especially acrylic acid, and an $\alpha$-olefin (i.e., ethylene, propylene, 1-butene, etc.), especially ethylene, is used. In this embodiment, the relative proportion of (alk)acrylic acid to $\alpha$-olefin is sufficient such that, after combination with the other components of the biodegradable composition of the invention, there is substantially no decrease in either water solubility of the composition or biodegradability of the composition, in comparison to those properties of a composition not containing this COOH-functional component. Preferably, the ratio of (alk)acrylic acid to $\alpha$-olefin is from about 1:9 to about 19:1. More preferably, the ratio of (alk)acrylic acid to $\alpha$-olefin is from about 1:7 to about 9:1. Most preferably, the ratio of (alk)acrylic acid to $\alpha$-olefin is from about 1:4 to about 4:1. In one preferred embodiment, the ratio of (alk)acrylic acid to $\alpha$-olefin is about 1:4. In another preferred embodiment, the ratio of (alk)acrylic acid to $\alpha$-olefin is about 4:1.

In the compositions of the present invention, the polyolefin homopolymer or copolymer can include, but is not limited to, polyethylene, polypropylene, hydrogenated polybutadiene, poly(1-butene), poly(1-hexene), poly(1-octene), or copolymers formed from any two or more of the monomers making up these homopolymers. In a preferred embodiment, the polyolefin is polyethylene. In another preferred embodiment, the polyolefin is a homopolymer of the α-olefin in the carboxylic acid-functional copolymer of the present invention.

In the compositions of the present invention, when present, the polymeric polyol can advantageously include any (co)polymeric or oligomeric compound having at least two hydroxyl groups, preferably at least one hydroxyl terminal group on each end of the compound molecule. Thus, the typical polymeric polyols according to the present invention can have a molecular weight of at least about 250 grams/mole, and preferably of less than about 10,000 grams/mole. Exemplary polymeric polyols include, but are not limited to, polyester polyols, polyglycerols, polyether polyols, and the like, or mixtures thereof. For instance, polyether polyols include polyalkylene glycols, e.g., such as polyethylene glycol, polypropylene glycol, etc., as well as mixtures or copolymers thereof In a preferred embodiment, the polymeric polyol includes polypropylene glycol. In another preferred embodiment, the polymeric polyol consists essentially of polypropylene glycol.

In the compositions of the present invention, the oil component includes saturated, monounsaturated, and polyunsaturated oils, e.g., those extracted or isolated from plant and/or animal sources, particularly edible oils. Examples of such saturated or unsaturated oils include, but are not limited to, sunflower, safflower, peanut, sesame, coconut, soybean, corn, canola, olive, vegetable, palmitins, stearins, oleins, and the like, or derivatives or combinations thereof. In a preferred embodiment, the oil component comprises coconut oil. The oil component may be present as naturally extracted, as synthesized, or as modified or processed in some way, e.g., partially or fully hydrogenated, partially or fully dehydrogenated, partially or fully saponified, partially or fully acidified, partially halogenated, or the like.

In the compositions of the present invention, the wax component, when present, is preferably a liquid wax, i.e., it has a viscosity of below about 111 cps at about 20° C., e.g., equal to or more fluid than a syrupy 83% by weight glycerol aqueous solution. Alternately, the viscosity of the liquid wax is preferably from about 0.1 cps to about 60 cps at about 20° C. More preferably, the liquid wax has a water-like viscosity of from about 0.5 cps to about 10 cps at about 20° C. Additionally, the term "liquid wax" as used herein includes solutions and flowable liquid-like substances which may contain a plurality of phases, such as mixtures, suspensions, emulsions, microemulsions, dispersions, pastes and slurries. To the extent that this is desirable, without being bound to any particular theory, the wax is thought to provide a lubricating function to the starch-containing composition.

Suitable wax components according to the invention can include, but are not limited to, hydrocarbon waxes (e.g., polyolefin waxes, such as polyethylene wax, polypropylene wax, and the like, or copolymers thereof), oligoester waxes, monoester waxes, oligoether waxes, monoether waxes, and the like, or combinations thereof. The wax component may be present as naturally extracted, as synthesized, or as modified or processed in some way, e.g., partially or fully hydrogenated, partially or fully dehydrogenated, partially or fully saponified, partially or fully acidified, partially halogenated, or the like. In one embodiment, the wax component does not contain a hydrocarbon wax.

In the compositions of the present invention, the powdered rubber compound, when present, can include, but is not limited to, butyl rubber, nitrile rubber, diene rubbers (e.g., such as natural rubber, butadiene rubber, isoprene rubber, chloroprene rubber, neoprene rubber, and the like, and copolymers thereof), diene block copolymer rubbers (e.g., styrene-butadiene, styrene-isoprene, SBS, SEBS, SEEBS, SIS, ABS, and the like), olefin copolymer rubbers (e.g., block copolymers such as SES, SEPS, SEEPS, SEP, and the like; other copolymers such as EP rubber, EPDM, partially hydrogenated diene rubbers, and the like; or mixtures or copolymers thereof), and mixtures or copolymers thereof. Preferably, the powdered rubber compound, when present, comprises natural rubber and, more preferably, comprises a compound where the rubber component of the compound consists essentially of natural rubber. Natural rubber, as known to those in the art, is a rubbery polymer suitably obtained from plants and comprises mainly cis-1, 4-isoprene units. As used herein, the term "natural rubber" also includes crepe rubber, i.e., natural rubber comprising sodium bisulfite, smoked sheets formed from natural rubber, masticated natural rubber, and vulcanized natural rubber.

As used herein, butyl rubber, isobutylene-isoprene rubber, and a copolymer of isobutylene and isoprene are synonymous. Although it is not necessary for the success of the present invention, if desired, the butyl rubber may optionally comprise functional groups, e.g., such as hydroxy, epoxy or halogen, e.g., chlorine and bromine. Typically, such groups are present as pendant side groups attached to the main polymer chain and/or as end-groups.

Suitable commercially available butyl rubber materials which may be used in the powdered rubber compound of the present invention include, but are not limited to, the butyl rubbers Butyl 165, 268, 365, 1065 and 1077 (available from Exxon Chemical), Butyl 100, 101-3, 200, 301, 302 and 402 (Polysar), and BK 1675N (Kautschuk-Gesellschaft GmbH, Germany); the chlorinated butyl rubbers Chlorobutyl 1065, 1066, and 1068 (Exxon Chemical) and Chlorobutyl 1240 and 1255 (Polysar); and the brominated butyl rubbers Bromobutyl 2222, 2233, 2244 and 2255 (Exxon Chemical) and Bromobutyl 2030 and X2 (Polysar). Suitable commercially available butadiene rubber materials which may be used in the powdered rubber compound of the present invention include, but are not limited to, the butadiene rubbers SHELL 1220 cis-1,4-polybutadiene (available from Shell Chemical) NEOCIS BR40® (Enichem Elastomers) and UBEPOL BR150® (Ube Industries, Ltd.).

Suitable commercially available SBS, SEBS, SEEBS, SIS and ABS type rubber materials which may be used in the powdered rubber compound of the present invention include, but are not limited to, the KRATON®) D series from Shell Chemical, which includes KRATON® D2109, D5119 and D5298; VECTOR® from Dexco; and FINAPRENE® from Fina Oil and Chemical. Suitable commercially available SES, SEPS, SEEPS and SEP type rubber materials which may be used in the powdered rubber compound of the present invention include, but are not limited to, the KRATON® G series from Shell Chemical, which includes KRATON® G2705, G7702, G7715 and G7720; SEPTON® from Kuraray; and C-FLEX® from Concept.

Additionally, the powdered rubber compound may be functionalized with polar moieties by performing, e.g., maleic anhydride or sulfonic grafting. Suitable commercially available copolymer rubber materials functionalized by grafting which may be used in the powdered rubber compound of the present invention include, but are not limited to, the KRATON® series from the Shell Corporation, which includes KRATON® FG1901X and FG1921X. Furthermore, copolymer rubber materials may be functionalized with hydroxy substitution at the polymer chain ends. An example of a suitable commercial styrene-block elastomer functionalized by hydroxy termination is SEPTON® HG252 from the Mitsubishi Chemical Company.

The powdered rubber compound, when present, can have an average particle diameter in the range of from about 0.5 microns to about 1 mm. Such particles may be substantially spherical or non-spherical; the "diameter" of a non-spherical particle is the dimension along a major axis.

In the compositions of the present invention, the cellulosic polymer, when present, can include, but is not limited to, native or synthetic cellulose, cotton, regenerated cellulose (e.g., rayon, cellophane, or the like), cellulose acetate, cellulose propionate, cellulose butyrate, cellulose acetate-propionate, cellulose acetate-butyrate, cellulose propionate-butyrate, cellulose nitrate, methyl cellulose, ethyl cellulose, carboxymethyl cellulose, carboxyethyl cellulose, cellulose salts, and combinations or copolymers thereof. The cellulosic polymer according to the invention may be present as naturally extracted, as synthesized, or as modified or processed in some way, e.g., partially or fully esterified, partially or fully nitrated, partially or fully regenerated, partially or fully etherified, partially or fully acidified, partially or fully acid-neutralized, or the like, or combinations thereof. A preferred cellulosic polymer of the invention comprises cellulose acetate and, more preferably, consists essentially of cellulose acetate.

The starch-containing component may be present in various amounts in the biodegradable polymeric compositions according to the invention, preferably in an amount from about 40 to about 60 percent by weight in relation to the total weight of all of the ingredients of the composition. In alternate preferred embodiments, the starch-containing component may be present in an amount from about 40 to about 52 percent by weight or from about 40 to about 50 percent by weight of the composition.

The polymer containing pendant carboxylic acid functional groups may be present in various amounts in the biodegradable polymeric compositions according to the invention, preferably in an amount from about 10 to about 20 percent by weight of the composition. In alternate preferred embodiments, the polymer containing pendant carboxylic acid functional groups may be present in an amount from about 10 to about 18 percent by weight or from about 10 to about 15 percent by weight of the composition.

The polyolefin homopolymer or copolymer may be present in various amounts in the biodegradable polymeric compositions according to the invention, preferably in an amount from about 8 to about 20 percent by weight of the composition. In alternate preferred embodiments, the polyolefin homopolymer or copolymer may be present in an amount from about 8 to about 15 percent by weight, from about 8.5 to about 12 percent by weight, or from about 15 to about 20 percent by weight of the composition.

Water may be present in various amounts in the biodegradable polymeric compositions according to the invention, preferably in an amount from about 2.5 to about 4 percent by weight, more preferably about 3 percent by weight of the composition.

The oil component may be present in various amounts in the biodegradable polymeric compositions according to the invention, preferably in an amount from about 3.5 to about 8 percent by weight of the composition. In alternate preferred embodiments, the oil component may be present in an amount from about 3.5 to about 6 percent by weight, from about 6 to about 8 percent by weight, or from about 5 to about 7 percent by weight of the composition.

When present, a polymeric polyol can be added to the biodegradable polymeric compositions according to the invention, preferably in an amount from about 1.5 to about 3.5 percent by weight, more preferably from about 2 to about 3 percent by weight of the composition.

When present, a wax component can be added to the biodegradable polymeric compositions according to the invention, preferably in an amount from about 3 to about 5 percent by weight of the composition.

When present, a powdered rubber compound can be added to the biodegradable polymeric compositions according to the invention, preferably in an amount from about 12 to about 28 percent by weight of the composition. In alternate embodiments, the powdered rubber component may be present in an amount from about 12 to about 20 percent by weight or from about 20 to about 28 percent by weight of the composition.

When present, a cellulosic polymer can be added to the biodegradable polymeric compositions according to the invention, preferably in an amount from about 10 to about 20 percent by weight of the composition.

The compositions of the present invention may be used in a wide variety of applications. Exemplary articles typifying such applications include, but are in no way limited to, footwear and footwear articles, a filter for gas(es), a smoking-related filter, a children's toy, a bottle, a container, netting, food packaging, a cup, a plate, a bowl, an injection molded article, a compression molded article, a foamed article, a film, and a laminated article. In preferred embodiments of the invention, the various compositions according to the invention can be used in fabricating footwear articles, a filter for gas(es), such as for purification thereof and/or removal of particles therefrom, smoking-related filters, especially cigarette filters or filter tips, and foamed articles. Therefore, the term "footwear article" as used herein includes items worn on the feet, such as shoes, sandals, slippers, moccasins, flip-flops, sneakers, boots, etc., and component parts thereof (e.g., soles, insoles, midsloes, outsoles, insole inserts, insteps, tongues, tread material, toe reinforcement, heels, cushions, etc.), and especially shoes of all types (e.g., casual, walking, dress, sports-related, such as for running, tennis, basketball, cross-training, golf, aquatic, skateboarding, soccer, wrestling, workout, hiking, climbing, etc., and the like) and component parts thereof.

Additional optional additives may be present in the compositions and/or articles of the present invention. For example, additional fillers may optionally be added to compositions and/or articles according to the present invention. When present, these additional fillers may include, but are not limited to, processing aids or compounds to affect Theological and mixing properties, the specific gravity (i.e., density-modifying fillers), the modulus, the tear strength, reinforcement, and the like.

Fillers are typically polymeric or inorganic in nature, and, when used, are typically present in an amount from about 0.1 to 50 weight percent of the biodegradable composition in which they are included. Any suitable filler available to one of ordinary skill in the art may be used. Exemplary fillers include, but are not limited to, precipitated hydrated silica; clay; talc; glass fibers; aramid fibers; mica; calcium metasilicate; barium sulfate; silicates; diatomaceous earth; carbonates such as calcium carbonate and magnesium carbonate; metals such as titanium, tungsten, aluminum, bismuth, nickel, molybdenum, iron, lead, copper, boron, cobalt, beryllium, zinc, and tin; metal oxides such as zinc oxide, iron oxide, magnesium oxide, and the like; particulate carbonaceous materials, such as graphite, carbon black, cotton flock, natural bitumen, cellulose flock, and leather fiber; micro balloons such as glass and ceramic; fly ash; or combinations thereof.

Optional additives may also include various foaming agents or blowing agents which may be readily selected by one of ordinary skill in the art. Foamed polymer blends may be formed by blending ceramic or glass microspheres with polymer material. Polymeric, ceramic, and glass microspheres may be solid or hollow, and filled or unfilled. In addition, a physical or chemical blowing or foaming agent may be included. These include, but are not limited to, organic blowing agents, such as azobisformamide; azobisisobutyronitrile; diazoaminobenzene; N,N-dimethyl-N,N-dinitroso terephthalamide; N,N-dinitrosopentamethylenetetramine; benzenesulfonyl-hydrazide; benzene-1,3-disulfonyl hydrazide; disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthane; p-sulfonhydrazide; peroxides; and inorganic blowing agents such as ammonium bicarbonate and sodium bicarbonate. A gas, such as air, nitrogen, carbon dioxide, etc., can also be introduced during processing to create a foamed article.

Additional materials conventionally included in biodegradable polymeric compositions may be added to the compositions of the invention. These additional materials include, but are not limited to, dyes, whitening agents, UV absorbers, processing aids, and mixtures thereof, and other conventional additives. Antioxidants, stabilizers, softening agents, plasticizers, including internal and external plasticizers, impact modifiers, toughening agents, reinforcing materials and compatibilizers can also be added to any composition of the invention. All of these materials, which are well known in the art, are added for their usual purpose in typical amounts. When adding an optional component to compositions or articles according to the present invention, it is typically desirable not to drastically decrease biodegradability of the resulting compositions (e.g., decrease by less than about half, in comparison to that of the compositions without such an optional component).

The biodegradable polymeric compositions of the invention can be further processed into articles by a variety of processes. Such processes may depend, of course, upon the nature of the article and include, but are not limited to, casting, injection molding, reaction injection molding, blow molding, compression molding, rolling, thermoforming, extrusion, reactive extrusion, solution processing, foaming, and the like, or combinations thereof.

Biodegradability can be characterized by a number of methods known to those in the art. Selection of the biodegradability method(s) suitable for the particular application is also within the capability of those in the art. For example, resistance to weathering upon exposure to various regimes of light, heat and/or humidity may be important for evaluating the biodegradability of, e.g., cigarette filters of the invention and can be evaluated by the change in a particular property, such as modulus, tensile strength, brittleness, porosity, permeability, loss in mass, etc., upon such exposure. Alternatively, artificial and/or accelerated weathering as specified in certain ASTM methods, e.g., by using an apparatus such as a "Weather-O-Meter", can substitute for "natural" weathering. Additionally, stability and/or deterioration of a particular property upon exposure to UV light can be monitored. Moreover, fungal and/or microbial attack under controlled aerobic or anaerobic conditions can be monitored as a measure of biodegradability of, e.g., articles of the invention in landfills. For example, tests under natural or simulated composting conditions can be carried out.

EXAMPLES

The preferred embodiments of the present invention will be illustrated by reference to the following examples, which are included to exemplify, but in no way limit, the scope of the present invention.

Example 1

Starch-Containing Composition According to the Invention

The starch-containing composition of Example 1 contains the following components in the following proportions by weight:

| | |
|---|---|
| starch, preferably corn starch | 55% |
| ethylene-acrylic acid copolymer | 10% |
| polypropylene glycol | 2.5% |
| coconut oil | 3.5% |
| liquid wax | 3.5% |
| natural rubber powder | 14% |
| polyethylene | 8.5% |
| water | 3% |

The starch-containing composition of Example 1 may be useful in a number of articles, but is particularly useful in shoes or other footwear articles, or a component part thereof.

Example 2

Method of Fabricating a Starch-Containing Composition According to the Invention to Form a Starch-Containing Resin The starch-containing resin of Example 2 was formed by combining the components of Example 1 in an extruder, e.g., such as a twin-screw extruder comprising one or more component/additive and pressure relief zones, with a predesignated temperature profile and extruding the composition of Example 1 to form the starch-containing resin. The temperature profile of the extruder and the particular order of addition of the components from Example 1 were as follows:

| Zone 1 | Zone 2 | Zone 3 | Zone 4 | Zone 5 | Zone 6 | Zone 7 | Zone 8 | Zone 9 | Zone 10 | Zone 11 | Zone 12 | Zone 13 | Zone 14 | Zone 15 |
|---|---|---|---|---|---|---|---|---|---|---|---|---|---|---|
| 30° C. * | 120° C. | 145° C. | 155° C. ** | 160° C. | 160° C. *** | 170° C. | 175° C. ** | 160° C. **** | 170° C. | 170° C. | 170° C. | 160° C. ** | 160° C. | 100° C. |

\* add the ethylene-acrylic acid copolymer, the rubber powder, and the polyethylene components in this zone
\*\* optionally, release pressure, e.g., from air and/or steam, in these zones
\*\*\* add the polypropylene glycol, the coconut oil, and the water components in this zone
\*\*\*\* add the starch and the liquid wax components in this zone After this extrusion step, the starch-containing resin may optionally be further processed, e.g., into a foam material such as a slab, for use in an article of the present invention, particularly in a shoe or other footwear articles, or a component part thereof.

Example 3

Articles Including the Starch-Containing Composition of the Invention

The starch-containing resin produced in Example 2 was formed into various footwear articles or component parts thereof.

Example 3a

Shoe Sole Including the Starch-Containing Composition of the Invention

The starch-containing resin produced in Example 2 was formed into a shoe sole by methods well known to those in the art. The shoe sole performed satisfactorily.

Example 3b

Sandal Including the Starch-Containing Composition of the Invention

The starch-containing resin produced in Example 2 was formed into a sandal by methods well known to those in the art. The sandal performed satisfactorily.

Example 3c

Casual Shoe Including the Starch-Containing Composition of the Invention

The starch-containing resin produced in Example 2 was formed into a casual shoe by methods well known to those in the art. The casual shoe performed satisfactorily.

Example 3d

Insole Including the Starch-Containing Composition of the Invention

The starch-containing resin produced in Example 2 was formed into an insole by methods well known to those in the art. The insole performed satisfactorily.

Example 3e

Insole Insert Including the Starch-Containing Composition of the Invention

The starch-containing resin produced in Example 2 is formed into an insole insert by methods well known to those in the art. The insole insert performs satisfactorily.

Example 3f

Heel Including the Starch-Containing Composition of the Invention

The starch-containing resin produced in Example 2 is formed into a heel by methods well known to those in the art. The heel performs satisfactorily.

Example 3g

Flip-Flop Including the Starch-Containing Composition of the Invention

The starch-containing resin produced in Example 2 is formed into a flip-flop by methods well known to those in the art. The flip-flop performs satisfactorily.

Example 3h

Sneaker Including the Starch-Containing Composition of the Invention

The starch-containing resin produced in Example 2 was formed into a sneaker, or walking shoe, by methods well known to those in the art. The sneaker/walking shoe performed satisfactorily.

Example 3i

Boot Including the Starch-Containing Composition of the Invention

The starch-containing resin produced in Example 2 is formed into a boot by methods well known to those in the art. The boot performs satisfactorily.

Example 3j

Slipper Including the Starch-Containing Composition of the Invention

The starch-containing resin produced in Example 2 was formed into a slipper by methods well known to those in the art. The slipper performed satisfactorily.

Example 3k

Mocassin Including the Starch-Containing Composition of the Invention

The starch-containing resin produced in Example 2 is formed into a mocassin by methods well known to those in the art. The mocassin performs satisfactorily.

Example 3m

Instep Including the Starch-Containing Composition of the Invention

The starch-containing resin produced in Example 2 is formed into an instep by methods well known to those in the art. The instep performs satisfactorily.

Example 3n

Midsole Including the Starch-Containing Composition of the Invention

The starch-containing resin produced in Example 2 was formed into a midsole by methods well known to those in the art. The midsole performed satisfactorily.

Example 3p

Outsole Including the Starch-Containing Composition of the Invention

The starch-containing resin produced in Example 2 was formed into an outsole by methods well known to those in the art. The outsole performed satisfactorily.

Example 4

Starch-Containing Composition According to the Invention

The starch-containing composition of Example 4 contains the following components in the following proportions by weight:

| | |
|---|---|
| starch, preferably corn starch | 45% |
| ethylene-acrylic acid copolymer | 12% |
| coconut oil | 5% |
| polyethylene | 15% |
| water | 3% |
| cellulose acetate | 20% |

The starch-containing composition of Example 4 may be useful in a number of articles, but is particularly useful in filters or filter tips for cigarettes or other smoking-related articles.

Example 5

Method of Fabricating a Starch-Containing Composition According to the Invention to Form a Starch-Containing Resin The starch-containing resin of Example 5 was formed by combining the components of Example 1 in an extruder, e.g., such as a twin-screw extruder, with a pre-designated temperature profile and extruding the composition of Example 4 to form the starch-containing resin. The temperature profile of the extruder and the particular order of addition of the components from Example 4 were as follows:

| Zone 1 | Zone 2 | Zone 3 | Zone 4 | Zone 5 | Zone 6 | Zone 7 | Zone 8 | Zone 9 | Zone 10 | Zone 11 | Zone 12 | Zone 13 | Zone 14 |
|---|---|---|---|---|---|---|---|---|---|---|---|---|---|
| 30° C. * | 130° C. | 150° C. | 160° C. ** | 170° C. *** | 170° C. | 170° C. | 170° C. | 120° C. **** | 140° C. | 140° C. | 145° C. ** | 140° C. | 100° C. |

\* add the ethylene-acrylic acid copolymer and the polyethylene components in this zone
\*\* optionally, release pressure, e.g., from air and/or steam, in these zones
\*\*\* add the cellulose acetate, the coconut oil, and the water components in this zone
\*\*\*\* add the starch component in this zone After this extrusion step, the starch-containing resin may optionally be further processed, e.g., into a fibrous material by a yam making machine, for use in an article of the present invention, particularly in a filter or filter tip of a cigarette or other smoking-related article.

Example 6

Article Including the Starch-Containing Composition of the Invention

The starch-containing resin produced in Example 4 was formed into a cigarette filter by methods well known to those in the art. The cigarette filter performed satisfactorily.

Although the present invention is described with reference to certain preferred embodiments, it is apparent that modification and variations thereof may be made by those skilled in the art without departing from the scope or this invention, particularly as defined by the appended claims.

Unless otherwise noted, all % values given herein are by weight percent (i.e., wt. %). Each reference cited herein is hereby incorporated by reference in its entirety.

What is claimed is:

1. A biodegradable polymeric composition comprising:
   from about 40 to about 52 percent by weight of a starch component;
   from about 10 to about 15 percent by weight of a polymer comprising pendant carboxylic acid functional groups;
   from about 8.5 to about 12 percent by weight of a polyolefin homopolymer or copolymer;
   from about 2.5 to about 4 percent by weight of water;
   from about 1.5 to about 3.5 percent by weight of a polymeric polyol;
   from about 6 to about 8 percent by weight of an oil component;
   from about 3 to about 5 percent by weight of a wax component; and
   from about 20 to about 28 percent by weight of a powdered rubber compound.

2. The biodegradable polymeric composition of claim 1, wherein the starch component comprises starch obtained from corn, potato, or yam.

3. The biodegradable polymeric composition of claim 1, wherein the polymer comprising pendant carboxylic acid functional groups is obtained by polymerizing a mixture comprising at least one α,β-unsaturated carboxylic acid monomer and at least one α-olefin.

4. The biodegradable polymeric composition of claim 3, wherein the polymer comprising pendant carboxylic acid functional groups is a copolymer of ethylene and acrylic acid.

5. The biodegradable polymeric composition of claim 1, wherein the polyolefin homopolymer or copolymer comprises polyethylene.

6. The biodegradable polymeric composition of claim 1, wherein the polymeric polyol comprises a polyalkylene glycol.

7. The biodegradable polymeric composition of claim 6, wherein the polymeric polyol comprises polypropylene glycol.

8. The biodegradable polymeric composition of claim 1, wherein the oil component comprises coconut oil.

9. The biodegradable polymeric composition of claim 1, wherein the wax component comprises a liquid wax having a viscosity below about 111 cps at about 20° C.

10. The biodegradable polymeric composition of claim 1, wherein the powdered rubber compound comprises butyl rubber, nitrile rubber, diene rubbers, diene block copolymer rubbers, olefin copolymer rubbers, and mixtures or copolymers thereof, and which rubber compound comprises natural rubber and has an average particle diameter in the range of from about 0.5 microns to about 1 mm.

11. A biodegradable polymeric composition comprising:
from about 45 to about 60 percent by weight of a starch component;
from about 10 to about 18 percent by weight of a polymer comprising pendant carboxylic acid functional groups;
from about 8 to about 15 percent by weight of a polyolefin homopolymer or copolymer;
from about 2.5 to about 4 percent by weight of water;
from about 1.5 to about 3.5 percent by weight of a polymeric polyol;
from about 3.5 to about 6 percent by weight of an oil component;
from about 3 to about 5 percent by weight of a liquid wax component; and
from about 12 to about 20 percent by weight of a powdered rubber compound.

12. The biodegradable polymeric composition of claim 11, wherein the starch component comprises starch obtained from corn, potato, or yam.

13. The biodegradable polymeric composition of claim 11, wherein the polymer comprising pendant carboxylic acid functional groups was polymerized from a mixture comprising at least one α,β-unsaturated carboxylic acid monomer and at least one α-olefin.

14. The biodegradable polymeric composition of claim 13, wherein the polymer comprising pendant carboxylic acid functional groups is a copolymer of ethylene and acrylic acid.

15. The biodegradable polymeric composition of claim 11, wherein the polyolefin homopolymer or copolymer comprises polyethylene.

16. The biodegradable polymeric composition of claim 11, wherein the polymeric polyol comprises a polyalkylene glycol.

17. The biodegradable polymeric composition of claim 16, wherein the polymeric polyol comprises polypropylene glycol.

18. The biodegradable polymeric composition of claim 11, wherein the oil component comprises coconut oil.

19. The biodegradable polymeric composition of claim 11, wherein the wax component comprises a liquid wax having a viscosity below about 111 cps at about 20° C.

20. The biodegradable polymeric composition of claim 11, wherein the powdered rubber compound comprises butyl rubber, nitrile rubber, diene rubbers, diene block copolymer rubbers, olefin copolymer rubbers, and mixtures or copolymers thereof, and which rubber compound comprises natural rubber and has an average particle diameter in the range of from about 0.5 microns to about 1 mm.

21. A biodegradable polymeric composition comprising:
from about 40 to about 50 percent by weight of a starch component;
from about 10 to about 15 percent by weight of a polymer comprising pendant carboxylic acid functional groups;
from about 15 to about 20 percent by weight of a polyolefin homopolymer or copolymer;
from about 2.5 to about 4 percent by weight of water;
from about 5 to about 7 percent by weight of an oil component; and
from about 10 to about 20 percent by weight of a cellulosic polymer.

22. The biodegradable polymeric composition of claim 21, wherein the starch component comprises starch obtained from corn, potato, or yam.

23. The biodegradable polymeric composition of claim 21, wherein the polymer comprising pendant carboxylic acid functional groups was polymerized from a mixture comprising at least one α,β-unsaturated carboxylic acid monomer and at least one α-olefin.

24. The biodegradable polymeric composition of claim 23, wherein the polymer comprising pendant carboxylic acid functional groups is a copolymer of ethylene and acrylic acid.

25. The biodegradable polymeric composition of claim 21, wherein the polyolefin homopolymer or copolymer comprises polyethylene.

26. The biodegradable polymeric composition of claim 21, wherein the oil component comprises coconut oil.

27. The biodegradable polymeric composition of claim 21, wherein the cellulosic polymer comprises cellulose acetate.

* * * * *